United States Patent
Horvath et al.

(10) Patent No.: US 7,593,419 B2
(45) Date of Patent: Sep. 22, 2009

(54) METHOD FOR CONTROLLING A CONNECTION IN A PACKET-ORIENTED COMMUNICATION NETWORK AND ARRANGEMENTS FOR IMPLEMENTING SAID METHOD

(75) Inventors: Ernst Horvath, Vienna (AT); Karl Klaghofer, München (DE)

(73) Assignee: Siemens Aktiengesellschaft, Munich (DE)

( * ) Notice: Subject to any disclaimer, the term of this patent is extended or adjusted under 35 U.S.C. 154(b) by 740 days.

(21) Appl. No.: 10/518,310

(22) PCT Filed: Jun. 12, 2003

(86) PCT No.: PCT/DE03/01951

§ 371 (c)(1),
(2), (4) Date: Dec. 16, 2004

(87) PCT Pub. No.: WO03/107690

PCT Pub. Date: Dec. 24, 2003

(65) Prior Publication Data

US 2005/0220152 A1    Oct. 6, 2005

(30) Foreign Application Priority Data

Jun. 17, 2002   (DE) ................................ 102 26 901

(51) Int. Cl.
*H04J 3/17*   (2006.01)
(52) U.S. Cl. .................... 370/433; 370/230; 370/467
(58) Field of Classification Search ................. 370/230, 370/433, 467
See application file for complete search history.

(56) References Cited

U.S. PATENT DOCUMENTS

| 6,363,065 | B1 * | 3/2002 | Thornton et al. ............ 370/352 |
| 6,885,658 | B1 * | 4/2005 | Ress et al. ................. 370/352 |
| 7,031,279 | B2 * | 4/2006 | Lee et al. ................... 370/331 |
| 7,379,475 | B2 * | 5/2008 | Minami et al. .............. 370/469 |
| 2001/0056496 | A1 | 12/2001 | Tam |

FOREIGN PATENT DOCUMENTS

| EP | 1 001 596 A2 | 5/2000 |
| EP | 1 014 665 A2 | 6/2000 |
| EP | 1 100 270 A2 | 5/2001 |
| WO | WO 00/76107 A2 | 12/2000 |

OTHER PUBLICATIONS

"Packet-based multimedia communications systems", ITU-T Recommendation H.323, Sep. 1999, pp. 1-129, XP002166480.
"Call transfer supplementary service for H.323", ITU-T Recommendation H.450-2, Feb. 1998, pp. 1-51, XP002152631.

* cited by examiner

*Primary Examiner*—Jason E Mattis

(57) ABSTRACT

Disclosed is a method for controlling a connection, according to which a signaling control device of the communication network triggers a first of several terminal points of the communication, which are connected via a user data channel, to close the user data channel by transmitting a first signaling message. The signaling control device also transmits a confirmation request message to a second of the terminal points of the communication, thereby triggering said second terminal point to transmit a confirmation message to the signaling control device if the user data channel has been successfully closed. If the signaling control device receives the confirmation message, the signaling control device triggers a terminal point of the communication to open at least one new user data channel by transmitting a second signaling message.

14 Claims, 2 Drawing Sheets

METHOD FOR CONTROLLING A CONNECTION IN A PACKET-ORIENTED COMMUNICATION NETWORK AND ARRANGEMENTS FOR IMPLEMENTING SAID METHOD

CROSS REFERENCE TO RELATED APPLICATIONS

This application is the US National Stage of International Application No. PCT/DE03/01951, filed Jun. 12, 2003 and claims the benefit thereof. The International Application claims the benefits of German application No. 10226901.7 filed Jun. 17, 2002, both applications are incorporated by reference herein in their entirety.

FIELD OF THE INVENTION

The invention relates to a method for controlling a connection in a packet-oriented communication network and arrangements for implementing said method.

BACKGROUND OF THE INVENTION

In contemporary communication systems communication connections, in particular real time connections, e.g. for voice, video or multimedia communication, are also increasingly routed via packet-oriented communication networks, e.g. local area networks or wide area networks. Internet telephony, also frequently referred to as VoIP telephony (Voice/Video over Internet Protocol) is for example based on this technology.

Modern packet-oriented real time communication systems are frequently based on a system architecture according to the ITU-T recommendation H.323. A so-called gatekeeper is generally provided for signaling control in such communication networks. While connection signaling is routed between connection end points via the gatekeeper, the user data to be transferred in the context of the connection is transmitted directly via user data channels set up between the connection end points. Communication systems according to the H.323 recommendation provide a wide range of service features known from conventional line-switched communication technology, such as call forwarding, call diversion and call waiting. A so-called pause and rerouting procedure is frequently implemented in H.323 communication networks to support or provide such service features. With the pause and rerouting procedure the gatekeeper prompts a respective connection end point to stop sending user data temporarily and to close the relevant user data channels. Once the user data channels are successfully closed, the gatekeeper can prompt the opening of new user data channels with modified characteristics or between other connection end points. Simple connection control can thus be implemented. The pause and rerouting procedure is for example described in section 8.4.6 of the H.323 recommendation.

In order to determine before new user data channels are opened whether the data channels to be closed have been closed successfully, according to the prior art to date all the user data channels of all existing connections have to be managed centrally by the gatekeeper. This also relates in particular to connections in which a pause and rerouting procedure is not executed. Such channel management however on the one hand requires a significant implementation outlay, both with regard to processing power and storage capacity, and on the other hand results in a greater susceptibility to error due to the database organization additionally required with its associated synchronization requirements. Both aspects have a negative impact on the scalability of a communication system.

SUMMARY OF THE INVENTION

The object of the present invention is to specify a method for controlling a connection in a packet-oriented communication network, with simpler sequence control than the prior art. The object of the invention is also to specify a signal control device and a packet-oriented communication network for implementing the method.

This object is achieved by the claims.

To control a connection, in particular a real time or quasi-real time connection, in a packet-oriented communication network, a signaling control device of the communication network prompts a first of a plurality of communication end points connected via at least one user data channel, in particular a logical user data channel, to close the at least one user data channel by transmitting a first signaling message.

The signaling control device can preferably be provided by a so-called gatekeeper according to the ITU-T recommendation H.323 or alternatively by a so-called SIP server according to the IETF standard SIP (Session Initiation Protocol). A respective communication end point may for example be a communication terminal, a so-called gateway between the packet-oriented communication network and a line-oriented communication network, a personal computer, a communication application or a communication client. The signaling control device is also used to transmit a confirmation request message to a second of the communication end points, prompting this latter to transmit a confirmation message to the signaling control device when the at least one user data channel has been successfully closed. If the confirmation message is received by the signaling control device, the latter prompts a communication end point, which can either be one of the communication end points referred to above or a further communication end point, to open at least one new user data channel by transmitting a second signaling message.

The inventive method makes it possible to ensure in a simple manner that the at least one user data channel to be closed has closed successfully, before a new user data channel is opened. Use is made here of the fact that a communication end point in a packet-oriented communication network manages its outgoing user data channels in an essentially independent manner and is thereby able to identify the successful closure of a user data channel directly. The inventive requesting of a channel closure confirmation from a communication end point can therefore be implemented with little outlay. In particular only a slight increase in signaling outlay is required and only then if a user data channel actually has to be closed and a new user data channel has to be opened. It is therefore not necessary for the signaling control device to manage and store user channel usage for all existing connections. This results in a significant economy with regard to storage capacity and processing outlay compared with the prior art and therefore a reduced susceptibility to error and better scalability.

Advantageous embodiments and developments are set out in the dependent claims.

According to a first embodiment of the invention transmission of the confirmation request message to the second communication end point can take place in the context of the user data channel closure prompted by the first signaling message, as a result of which the second communication end point is prompted to confirm this user data channel closure when successful. In this case the confirmation message confirms only a single closing process, in which at least one user data channel is closed.

According to a second embodiment transmission of the confirmation request message to the second communication end point can take place after the connection has been set up, as a result of which the second communication end point is prompted for the duration of the connection to transmit a confirmation message to the signaling control device when a user data channel has been successfully closed. In this case a respective confirmation request message only has to be sent once per connection, thereby reducing the required signaling outlay compared with the first embodiment.

According to a third embodiment of the invention transmission of the confirmation request message to the second communication end point can take place after registration of the second communication end point with the signaling control device, as a result of which the second communication end point is prompted for the duration of its registration to transmit a confirmation message to the signaling control device when a user data channel has been successfully closed. In this case only one confirmation request message has to be transmitted per registration, thereby reducing the signaling outlay compared with the first embodiment.

According to a further advantageous embodiment the first communication end point can be identical to the second communication end point. In particular this means that the confirmation request message is transmitted to the communication end point, which is prompted by the first signaling message to close the at least one user data channel.

According to one advantageous development of the invention, if the confirmation message is not received within a predefined time interval, the signaling control device can analyze signaling traffic transmitted in the context of the connection to identify successful closure of the at least one user data channel. When successful closure has been identified, the signaling control device can prompt the opening of the at least one new user data channel. The signaling control device thus behaves in a backward-compatible manner, in so far as communication end points according to the prior art can also be activated, which are not designed for the inventive method.

A generic message extended to include a specific confirmation request information element can also be transmitted as the confirmation request message and/or a generic message extended to include a specific confirmation information element can be transmitted as the confirmation message. Such a generic message can hereby be extended in each instance to include a specific data field or an existing generic field of a respective message can be assigned a corresponding significance, for example in the context of a so-called GEF feature (Generic Extensibility Feature) according to the ITU-T H.460.x series recommendations.

A channel closure message, e.g. a so-called CLC message (Close Logical Channel) to close the at least one user data channel can be transmitted from the first communication end point to a communication end point connected to this via the at least one user data channel via the signaling control device.

The communication network can preferably be set up according to the ITU-T recommendation H.323. In this case a so-called terminal capability set message according to the ITU-T recommendation H.245 with an empty capability set can also be transmitted as the first signaling message. Receipt of such a terminal capability set message with an empty capability set prompts a communication end point to close its user data transmission channels.

The confirmation request message and/or the confirmation message respectively can also be configured as a so-called RAS (Registration, Admission and Status) message according to the ITU-T recommendation H.225.0. IRQ (Information Request) messages, IRR (Information Request Response) messages, ACF (Admission Confirm) messages and/or RCF (Registration Confirm) messages can for example also be used as RAS messages. When an ACF of RCF message is used as a confirmation request message, a confirmation request can relate to the duration of a connection or the duration of a registration.

According to a further embodiment of the invention the communication network can be set up according to the IETF standard SIP (Session Initiation Protocol).

According to an advantageous development of the invention it can be specified by the confirmation request message whether the successful closure of a user data transmission channel and/or whether the successful closure of a user data receiving channel should be confirmed. Similarly it can be specified by the confirmation message whether a successfully closed user data channel is a user data transmission channel or a user data receiving channel.

BRIEF DESCRIPTION OF THE DRAWINGS

An exemplary embodiment of the invention is described in more detail below with reference to the drawing, in which.

DETAILED DESCRIPTION OF THE INVENTION

Figure 1:
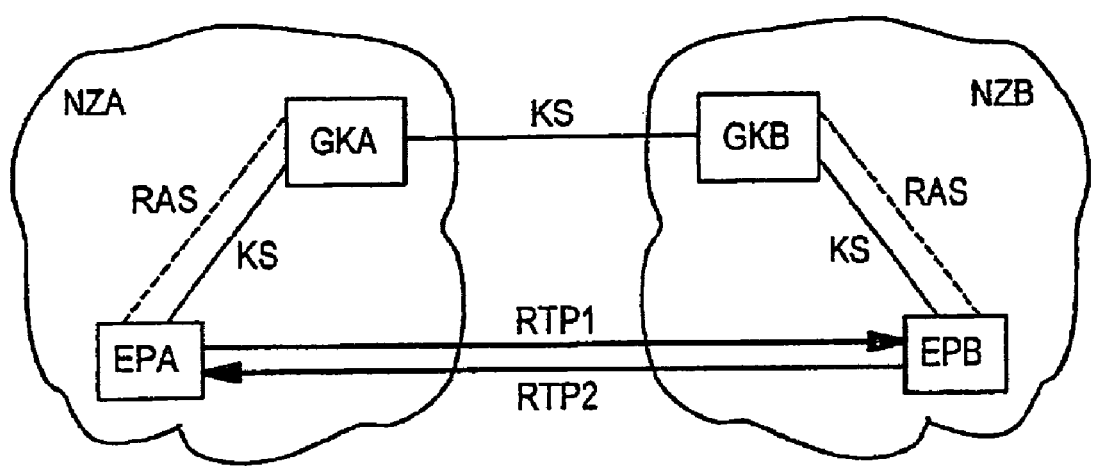
FIG. 1 shows a diagrammatic representation of a packet-oriented communication system with terminals linked via logical user data channels in different network zones and FIGS. 2 and 3 show diagrammatic representations of a flow diagram of an inventive signaling sequence during the opening and closing of a user data channel.

FIG. 1 shows a diagrammatic representation of a packet-oriented communication system comprising different network zones NZA and NZB. The network zones NZA and NZB can be both different packet-oriented communication networks and different subnetworks of the same or different communication networks. In the present exemplary embodiment it should be assumed that the network zones NZA and NZB are configured as internet protocol-based communication networks according to the ITU-T recommendation H.323. While the network zone NZA comprises a terminal EPA as the communication or connection end point and a signaling control device GKA, the network zone NZB has a terminal EPB as its communication or connection end point and a signaling control device GKB.

In the context of a real time connection logical user data channels RTP1 and RTP2 are open between the terminals EPA and EPB for the real time transmission of user data, e.g. in the form of voice, video or multimedia data streams, according to the so-called RTP protocol (Real Time Protocol). The user data channels RTP1, RTP2 operate directly between the terminals EPA and EPB. The user data channel RTP1 is thereby used for the transmission of user data from the terminal EPA to the terminal EPB and the user data channel RTP2 for the transmission of user data from the terminal EPB to the terminal EPA. From the point of view of the terminal EPA the user data channel RTP1 is therefore a user data transmission channel and the user data channel RTP2 is a user data receiving channel.

The signaling control devices GKA and GKB, which can for example be in the form of gatekeepers according to the H.323 recommendation, are each responsible for controlling call signaling at signaling level in their respective network zones NZA and NZB. To this end channel control signaling KS takes place respectively between the signaling control device GKA and the terminal EPA, between the signaling control device GKB and the terminal EPB and mutually between the signaling control devices GKA and GKB. In particular user signaling between the terminals EPA and EPB in the context of the channel control signaling KS is routed via the signaling control devices GKA and GKB. The user data channels RTP1 and RTP2 are controlled according to the ITU-T recommendation H.245 by the channel control signaling KS.

The signaling control devices GKA and GKB are themselves not directly involved in the transmission of user data, as this is transmitted directly between the terminals EPA and EPB. This type of data transmission is also frequently referred to as peer-to-peer transmission. There is therefore no need for complex user data channel management in the signaling control devices GKA and GKB.

Network zone-internal so-called RAS (Registration, Admission and Status) signaling according to the ITU-T recommendation H.225.0 also takes place between the signaling control device GKA and the terminal EPA and between the signaling control device GKB and the terminal EPB. In the context of the RAS signaling RAS, shown in FIG. 1 with a broken line, RAS messages are exchanged between the terminal EPA or EPB and the signaling control device GKA or GKB responsible for its network zone NZA or NZB. Provision is however not made for RAS messages to be transmitted between the signaling control devices GKA, GKB of different network zones NZA and NZB.

Figure 2:
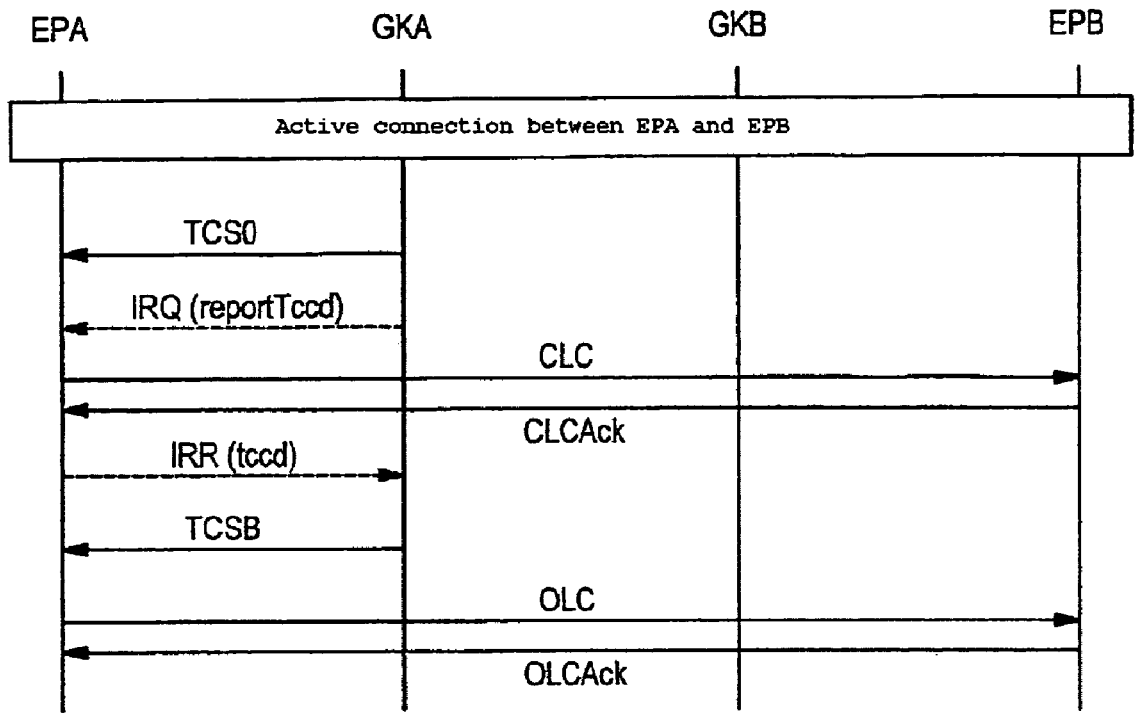
Figure 3:
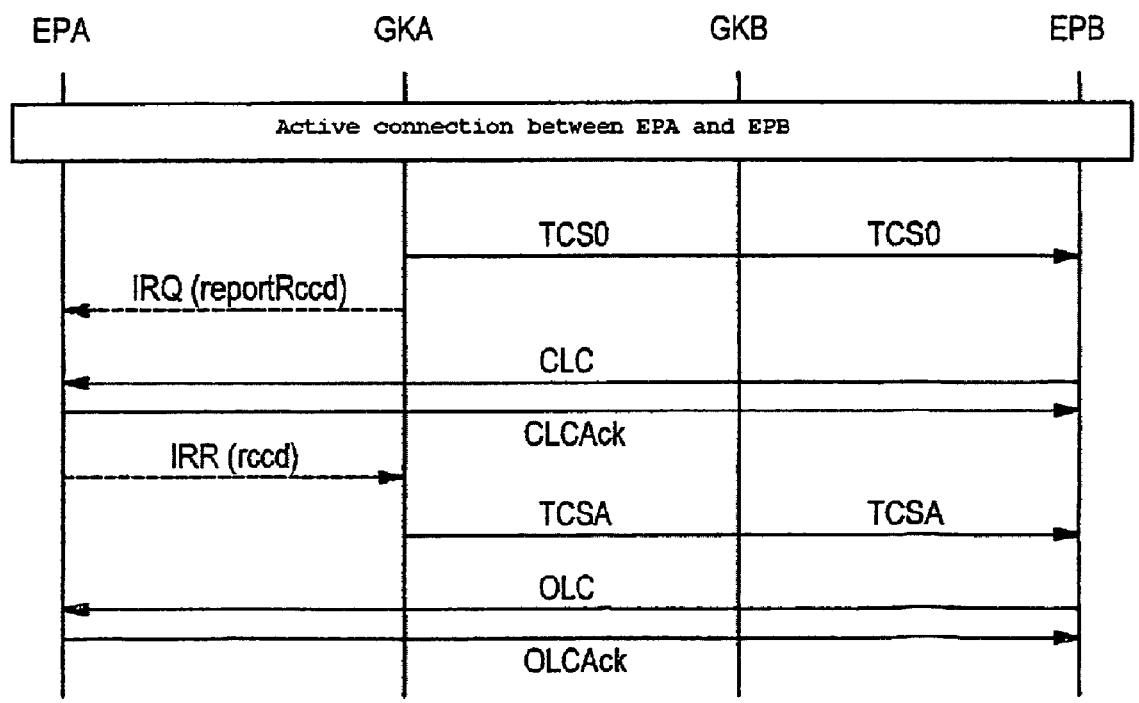

FIGS. 2 and 3 each show a flow diagram to illustrate an inventive signaling sequence during the opening and closing of a user data channel. Both FIGS. 2 and 3 relate to an initial situation, in which an active connection exists with open user data channels RTP1 and RTP2 between the terminals EPA and EPB. Media streams can be rerouted, e.g. in the context of a conference circuit, in a simple fashion by closing and then opening user data channels.

FIG. 2 shows a first embodiment of the inventive method, in which the signaling control device GKA prompts the terminal EPA in its network zone NZA to close its user data transmission channel RTP1. To this end the signaling control device GKA sends a so-called terminal capability set message TCS0 according to the ITU-T recommendation H.245 with an empty capability set to the terminal EPA as the first signaling message in the context of the channel control signaling KS. The terminal capability set message TCS0 with its empty capability set prompts the terminal EPA indirectly to close all its user data transmission channels, in this case only RTP1, in the context of the existing connection. The signaling control device GKA then transmits a so-called IRQ (Information Request) message in the context of the RAS signaling RAS. According to the ITU-T recommendation H.225.0 an IRQ message is generally used to request information.

According to the invention the IRQ message contains a new information element reportTccd (report transmit channels closed), by means of which the terminal EPA is prompted to confirm successful closure of the user data channel RTP1. The IRQ message IRQ is therefore used as a confirmation request message.

To close the user data channel RTP1, the terminal EPA sends a channel closure message CLC (Close Logical Channel) according to the ITU-T recommendation H.245 transparently via the signaling control devices GKA and GKB to the terminal EPB in the context of the channel control signaling KS. The terminal EPE then confirms successful closure of the user data channel RTP1 by means of a channel closure confirmation message CLCAck, which is transmitted transparently via the signaling control devices GKB and GKA to the terminal EPA. If a plurality of user data channels have to be closed, the channel-specific messages CLC and CLCAck should be transmitted respectively for each of the user data channels to be closed.

Receipt of the channel closure confirmation message CLCAck allows the terminal EPA—unlike the signaling control devices GKA and GKB—to identify successful closure of the user data channel RTP1 directly. As a result the terminal EPA—prompted by the IRQ message IRQ—sends a so-called IRR (Information Request Response) message as a confirmation message to the signaling control device GKA in the context of the RAS signaling RAS. Such an IRR message is generally used according to the ITU-T recommendation H.225.0 to respond to a previously received IRQ message. For implementation of the inventive method, the IRR message IRR contains a new information element tccd (transmit channels closed) by means of which the successful closure of the user data channel RTP1 is confirmed.

On receipt of the IRR message IRR with the information element tccd the signaling control device GKA identifies that the user data channel RTP1 has been successfully closed. As a result the signaling control device GKA transmits a terminal capability set message TCSB according to the ITU-T recommendation H.245 with a non-empty capability set to the terminal EPA as a second signaling message in the context of the channel control signaling KS. The terminal capability set message TCSB with its non-empty capability set prompts the terminal EPA to open one or a plurality of new user data transmission channels. The closing and opening of user data transmission channels by means of terminal capability set messages is also referred to as a pause and rerouting procedure.

To open a new user data transmission channel the terminal EPA transmits a channel opening message OLC (Open Logical Channel) via the signaling control devices GKA and GKB to the terminal EPB or to another terminal in the context of the channel control signaling KS. Opening of the new user data channel is confirmed by a channel opening confirmation message OLCAck.

FIG. 3 shows a second embodiment of the inventive method, in which the signaling control device GKA prompts the terminal EPB in the other network zone NZB to close its user data transmission channel RTP2. To this end the signaling control device GKA sends a terminal capability set message TCS0 with an empty capability set via the signaling control device GKB to the terminal EPB as a first signaling message in the context of the channel control signaling KS. The terminal EPB is thereby indirectly prompted to close all its user data transmission channels, in this case only RTP2, in the context of the existing connection. Unlike with the first embodiment of the invention described above, the signaling control device GKA cannot transmit a RAS message as a confirmation request message to the terminal EPB prompted to close its user data transmission channels, as there is generally no provision for the transmission of RAS messages between different network zones.

To resolve this problem, the signaling control device GKA sends an IRQ message IRQ as a confirmation request message to the terminal EPA in the context of the RAS signaling RAS. This IRQ message IRQ thereby contains a new information element reportRccd (report receive channels closed), by means of which the terminal EPA is prompted to confirm the successful closure of its user data receiving channel RTP2.

On receipt of the terminal capability set message TCS0 with its empty capability set the terminal EPB sends a channel closure message CLC to the terminal EPA in the context of the channel control signaling KS. The terminal EPA then closes its user data receiving channel RTP2 and confirms its successful closure by transmitting a channel closure confirmation message CLCAck to the terminal EPB. The terminal EPA—prompted by the prior receipt of the IRQ message IRQ with the information element reportRccd—also confirms the successful closure of its user data receiving channel RTP2 by transmitting an IRR message IRR. According to the invention the IRR message IRR thereby contains a new information element rccd (receive channels closed). The information element rccd confirms the successful closure of the user data channel RTP2 to the signaling control device GKA.

After this confirmation the signaling control device GKA can prompt the opening of one or a plurality of new user data transmission channels by transmitting a terminal capability set message TCSA with a non-empty capability set to the terminal EPB or to another terminal. To open a new user data transmission channel the terminal EPB, as already described similarly in relation to FIG. 2, transmits a channel opening message OLC in the context of the channel control signaling KS to the terminal EPA, which confirms this by means of a channel opening confirmation message OLCAck.

The signaling sequences illustrated in FIGS. 2 and 3 can advantageously be combined to close and open user data channels RTP1, RTP2 in a parallel fashion at both terminals EPA and EPB. To this end the signaling control device GKA can transmit a terminal capability set message TCS0 with an empty capability set in a parallel fashion to both terminals EPA and EPB. Correspondingly the signaling control device GKA can transmit an IRQ message to the terminal EPA, containing both the information element reportTccd and the information element reportRccd. The terminal EPA is thereby prompted to confirm the successful closure of both its user data transmission channel RTP1 and its user data receiving channel RTP2. Confirmation can be effected in some instances by means of an IRR message containing the information elements Tccd and Rccd.

Alternatively a signaling control device, in this case GKA, can activate a communication end point, in this case EPB, which is located in an external network zone, in this case NZB, by means of messages and information elements according to the ITU-T recommendations H.225.0 annex G or H.501 or via corresponding protocols.

The inventive method allows a specific exchange of information between the communication end point and the signaling control device about the successful closure of user data channels. The method is based on existing functionalities and develops these specifically. Because it uses existing or standard messages, the method can in particular be deployed in a backward-compatible fashion, so that essentially no interoperability problems occur. The increased signaling outlay resulting from the additional IRQ and IRR messages can be considered as negligible, particularly as this increased outlay only occurs when user data channels are closed and opened again as described.

The inventive method, which is described in the exemplary embodiment in relation to an H.323 communication system, can also be used similarly in other packet-oriented communication systems, for example in so-called SIP (Session Initiation Protocol) communication systems in the context of the so-called re-invite method.

The invention claimed is:

1. A method for controlling a connection in a packet-oriented communication network, wherein the network comprises a first network zone with a first signaling control device and a first terminal, a second network zone with a second signaling control device and a second terminal, a first data communication channel transmitting user data from the first terminal to the second terminal, and a second data communication channel transmitting user data from the second terminal to the first terminal, wherein the first and second data channels form a peer-to-peer communication relationship between the first and second terminals, the method comprising:

the first signaling control device sending a first terminal capability set message with an empty capability set to the first terminal, prompting the first terminal to close the first data communication channel;

the first signaling control device sending a channel closure first confirmation request message containing a report-transmit-channels-closed information element to the first terminal;

the first terminal sending a channel closure message transparently via the first and second signaling control devices to the second terminal, prompting the second terminal to close the first data communication channel;

the second terminal sending a channel closure first confirmation message transparently via the first and second signaling control devices to the first terminal;

as a result of receiving the channel closure first confirmation message, the first terminal sending an information request response message as a channel closure confirmation second message to the first signaling control device;

as a result of receiving the information request response, the first signaling control device transmitting a second terminal capability set message with a non-empty capability set to the first terminal, prompting the first terminal to open a new data communication channel.

2. The method of claim 1, further comprising:

as a result of receiving the second terminal capability set message, the first terminal transmitting a channel opening message to the second terminal or to a third terminal;

as a result of receiving the channel opening message, the second terminal or the third terminal opening a new peer-to-peer user data channel to the first terminal, and transmitting a channel opening confirmation message to the first terminal.

3. The method of claim 2, wherein a channel closure confirmation request message is transmitted from the first signaling control device to the second terminal or the third terminal after the new data channel is opened, prompting the second terminal or the third terminal to confirm to the first signaling control device any closure of the new peer-to-peer user data channel for the duration of the new peer-to-peer user data channel.

4. The method of claim 2, wherein a channel closure second confirmation request message is transmitted from the first signaling control device to the second terminal or the third terminal after a registration of the second terminal or the third terminal with the first signaling control device, prompting the second terminal or the third terminal to confirm to the first signaling control device any closure of the new peer-to-peer user data channel for the duration of the registration.

5. The method according to claim 1, wherein a generic message, extended to include a specific confirmation request information element, is transmitted as the channel closure first confirmation request message.

6. The method according to claim 1, wherein a generic message, extended to include a specific confirmation information element, is transmitted as the channel closure first confirmation message.

7. The method according to claim 1, wherein the communication network is set up according to the ITU-T recommendation H.323.

8. The method according to claim 1, wherein a terminal capability set message according to the ITU-T recommendation H.245 with an empty capability set is transmitted as the first terminal capability set message.

9. The method according to claim 1, wherein the confirmation request message and/or the confirmation message are each configured as a RAS (Registration, Admission and Status) message according to the ITU-T recommendation H.225.0.

10. The method according to claim 1, wherein the communication network is set up according to the IETF standard SIP (Session Initiation Protocol).

11. The method according to claim 1, wherein it is specified by the channel closure first confirmation message whether a successful closure of a user data transmission channel and/or whether a successful closure of a user data receiving channel should be confirmed.

12. The method according to claim 1, wherein it is specified by the channel closure first confirmation message whether a successfully closed data channel is a user data transmission channel or a user data receiving channel.

13. A method for controlling a connection in a packet-oriented communication network, wherein the network comprises a first network zone with a first signaling control device and a first terminal, a second network zone with a second signaling control device and a second terminal, a first data communication channel transmitting user data from the first terminal to the second terminal, and a second data communication channel transmitting user data from the second terminal to the first terminal, wherein the first and second data channels form a peer-to-peer communication relationship between the first and second terminals, the method comprising:

the first signaling control device sending a first terminal capability set message with an empty capability set to one of the first or second terminals, prompting said one terminal to close the data communication channel transmitting therefrom;

said one terminal sending a channel closure message transparently via the first and second signaling control devices to the other of the first and second terminals, prompting said other terminal to close the data communication channel transmitting from said one terminal;

said other terminal sending a channel closure first confirmation message transparently via the first and second signaling control devices to said one terminal;

as a result of receiving the information request response, the first signaling control device transmitting a second terminal capability set message with a non-empty capability set to said one terminal, prompting said one terminal to open a new data communication channel;

the first signaling control device sending a first terminal capability set message with an empty capability set to the second terminal via the second signaling control device, prompting the second terminal to close the second data communication channel;

the first signaling control device sending a closure confirmation request message containing a report-receive-channels-closed information element to the first terminal;

as a result of receiving the first terminal capability set message, the second terminal sending a channel closure message transparently via the first and second signaling control devices to the first terminal, prompting the first terminal to close the second data communication channel;

the first terminal sending a channel closure first confirmation message transparently via the first and second signaling control devices to the second terminal;

the first terminal sending an information request response message as a channel closure confirmation second message to the first signaling control device;

the first signaling control device, as a result of receiving the information request response, transmitting a second terminal capability set message with a non-empty capability set to the second terminal via the second signaling control device, prompting the second terminal to open a new data communication channel.

14. The method of claim 13, further comprising:

as a result of receiving the second terminal capability set message, the second terminal transmitting a channel opening message to the first terminal or to a third terminal;

as a result of receiving the channel opening message, the first terminal or the third terminal opening a new peer-to-peer user data channel to the second terminal, and transmitting a channel opening confirmation message to the second terminal.

* * * * *